Nov. 17, 1931.   E. H. MARBLE   1,832,717

REVOLVER FOR CLOTH SHEARING MACHINES

Filed Feb. 2, 1931

Inventor
Edwin H. Marble
By Attorneys
Southgate Fay & Hanley

Patented Nov. 17, 1931

1,832,717

UNITED STATES PATENT OFFICE

EDWIN H. MARBLE, OF WORCESTER, MASSACHUSETTS, ASSIGNOR TO CURTIS & MARBLE MACHINE COMPANY, OF WORCESTER, MASSACHUSETTS, A CORPORATION OF MASSACHUSETTS

REVOLVER FOR CLOTH SHEARING MACHINES

Application filed February 2, 1931. Serial No. 512,783.

This invention relates to the so-called revolver or revolving element of a cloth shearing pair. Such a cloth shearing pair comprises a stationary blade and a cylindrical revolving element on which are a plurality of blades coming into shearing relation with the stationary blade as the revolver rotates.

The principal object of this invention is to provide a construction whereby the hardened steel strips, constituting the cutting blades on the revolver, will be held firmly in position on the revolver so as to avoid displacement in any direction and yet can be removed therefrom and replaced by new blades or strips without necessitating the performance of any mechanical work on the revolver, thus introducing an important economy in the manufacture and repair of these expensive devices and avoiding the necessity of permanently mounting these strips on the revolver. By this invention the original cost of the revolver is very materially reduced and the expense for repairs is cut down by an extremely large percentage.

Other objects and advantages of the invention will appear hereinafter.

Reference is to be had to the accompanying drawings, in which

Figure 1:
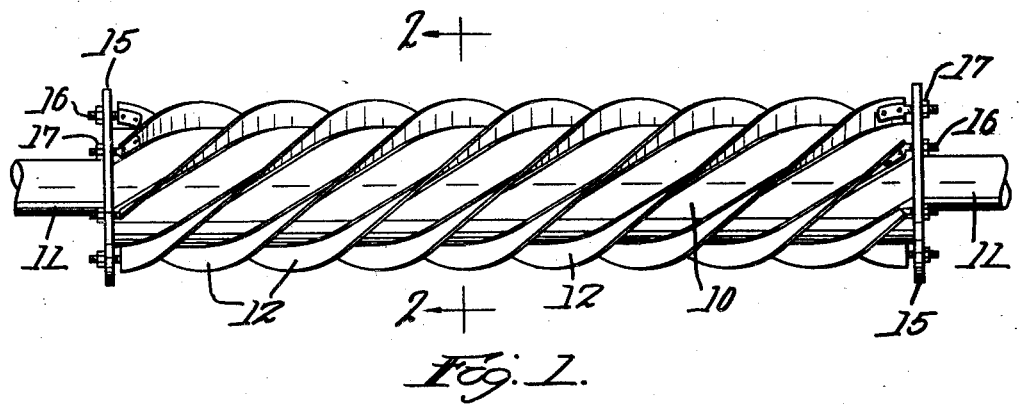
Fig. 1 is a plan of a revolver with a preferred embodiment of this invention applied to it.

The drawings show several types of revolvers now in use. Each revolver comprises a cylindrical bar 10 mounted on studs 11 or a shaft and provided with a series of strips 12 arranged helically and at such an angle that each one extends from one end to the other and makes one turn in 45 to 76 inches in length. These strips 12 are made in part or wholly of hardened steel and, as indicated more fully in Fig. 2, constitute the cutting blades which come into cutting or shearing relation with the stationary blade 13.

The usual method of making these revolvers is to cut or mill a series of longitudinal grooves approximately radially into the surface of the cylindrical bar 10. These grooves are arranged helically of a depth greater than the width of their butts. Into these grooves are placed the butts of the strips 12 which are made with parallel side walls. These strips are secured therein by compressing or upsetting the metal off the edges of the grooves against the strip. This firmly and permanently secures each strip in place. This unit is then ground in a cylindrical form outside, producing the section composed of the central bar 10 with radially projecting helical blades.

This method of construction provides a rigid revolver but it is very expensive to make in the first place and accidental breakage of any part of any cutting strip during the shearing process necessitates a tedious and expensive repair job. That portion of the cutting strip that is injured or the entire length of that particular strip has to be cut out or removed by easing up the compressed portion of the metal adjacent to the strip, clearing out the groove where it has been removed and inserting a new strip or portion thereof. This new strip or portion has to be secured in the groove by a process substantially the same as that by which the original one was fixed therein, requiring the recalking of the cylinder.

By the present invention these disadvantages are very largely eliminated. The strips 12 are first curved or twisted to a form in which the whole series of them constitute a cylindrical shape outside and also have a cylindrical passage through them. These strips are placed one by one on the surface of the bar 10 which has previously been provided with a series of helical longitudinal shallow grooves 14. These strips are placed on the bar with their bases in these grooves and held in definite circumferential position by drawing them taut longitudinally along the bar.

A preferred way of accomplishing this result is shown in which at each end of the bar 10 is a collar 15 fixed in position. These collars are provided with perforations equal in number to the helical grooves on the bar and of course, spaced equally. Through these perforations extend threaded ends 16 on the strips 12 and the bars are drawn taut by means of nuts 17 on these ends on the outside of the collars 15.

The bases of the strips as stated are located in the grooves 14 and the grooves are made of exactly the proper width to receive them. The collars 15 being stationary and all the nuts being tightened up, the strips are compelled to lie in these grooves and there is no means for holding the strips in position except the edges of the grooves and the tightening devices.

This provides a revolver simpler in construction and less expensive than those on the market. The collars and fastening means would provide a sufficient means for holding the strips under ordinary conditions in the grooves, but there would be a liability of the screws working loose and the strips creeping along the circumference of the bar, thus bringing the outer or cutting edge of a strip out of position and causing irregular diameter of the surface of the bar. For that reason the grooves 14, with their edges arranged parallel, constitute a very important element of this invention. The strips are not capable of shifting back and forth on account of these grooves and they cooperate with the end fastening means to hold the strips against movement in all directions without fastening the butts of the strips to the bar.

By introducing these strips into the surface of the bar the diameter of the bar at that point is reduced. It is in this reduced diametrical section that the strips are placed, it being remembered that they are cylindrically curved to fit the grooves before they are applied to its surface. If a strip is mounted in this way and is injured or broken a new strip can be inserted readily at a small expense by loosening the old one, taking it off and placing the new one in position without any cutting of the metal of the cylinder or bar 10 and without any disturbance of any work that has previously been done upon it.

Figures 2, 3:
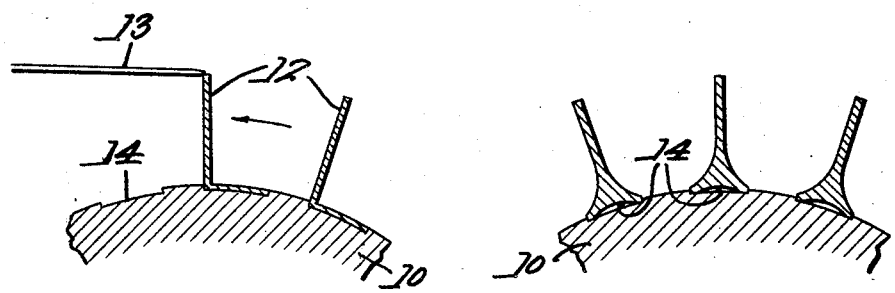
Fig. 2 is a transverse sectional view on enlarged scale on the line 2—2 of Fig. 1.
Figs. 3 and 4 are views similar to Fig. 2 showing the application of the invention to other types of strips or cutting blades.
Figure 4:
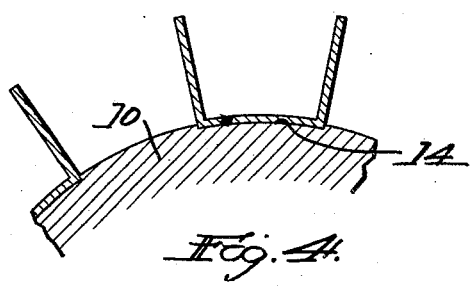

Figs. 2, 3 and 4 are introduced to show the application of this invention to three old types of strips 12. The three forms shown in these three figures are well known and have been used in the old methods before. They are all equally adaptable for use with this invention.

It will be seen that each cutting strip having been bent upon edge in helical form, the inner diameter of which helix is approximately the diameter of the bar, elongation of the strip causes a responding reduction in the inner diameter of the helix. By taking advantage of this fact, first curving the strip in helical form, as stated, and providing the solid section with helical shallow grooves of a width equal to the base section of the helical strip, thus reducing the diameter of the solid section by an amount equal to the depth of the grooves, the exertion of a longitudinal strain on the strip draws each strip into its own shallow groove and prevents any circumferential movement of the strip around the solid portion of the cutting section.

Although I have illustrated and described only three forms of the cutting strip and only one means for applying endwise tension to the strips I am aware of the fact that this invention can be applied to other forms of cutting strips and that other means for securing the longitudinal tension and holding the strips in place longitudinally can be employed without departing from the scope of this invention as expressed in the accompanying claims.

Therefore I do not wish to be limited in these respects but what I do claim is:—

1. A revolver or cylindrical unit of the cutting section of a cloth shearing machine comprising a cylindrical bar having helical grooves upon its surface, cutting strips having bases of the same width as said grooves so as to fit therein, and means for drawing the strips into the grooves by the exertion of a longitudinal strain on the strips at their ends.

2. The method of making a revolver for a cloth shearing machine which consists in preparing a cylindrical bar with shallow parallel sided helical grooves along its surfaces, bending an equal number of hardened steel cutting strips into a corresponding helical shape, placing the butts of the strips in the grooves, and applying force to the ends of the strips to pull them into the grooves, the strips being kept under tension so that they will remain in place without other means.

In testimony whereof I have hereunto affixed my signature.

EDWIN H. MARBLE.